US009559515B2

(12) United States Patent
Frangen

(10) Patent No.: US 9,559,515 B2
(45) Date of Patent: Jan. 31, 2017

(54) METHOD FOR SWITCHING A SENSOR SYSTEM BETWEEN MODES AND SWITCHABLE SENSOR SYSTEM

(71) Applicant: Robert Bosch GmbH, Stuttgart (DE)

(72) Inventor: Joachim Frangen, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 670 days.

(21) Appl. No.: 13/928,040

(22) Filed: Jun. 26, 2013

(65) Prior Publication Data

US 2014/0001888 A1   Jan. 2, 2014

(30) Foreign Application Priority Data

Jun. 29, 2012  (DE) .................. 10 2012 211 231
Jul. 20, 2012   (DE) .................. 10 2012 212 754

(51) Int. Cl.
  *H02H 11/00*   (2006.01)
  *H02H 5/12*    (2006.01)
  *F16P 3/14*    (2006.01)
  *F16P 7/02*    (2006.01)

(52) U.S. Cl.
  CPC ............. *H02H 5/12* (2013.01); *F16P 3/148* (2013.01); *F16P 7/02* (2013.01)

(58) Field of Classification Search
  CPC ............. H02H 5/12; F16P 3/12; F16P 3/148; F16P 7/00–7/02; F16P 3/148
  USPC ........................................................ 307/326
  See application file for complete search history.

(56) References Cited

U.S. PATENT DOCUMENTS

| 5,103,085 A * | 4/1992 | Zimmerman ........... G01S 17/06 250/214 B |
| 8,122,798 B1 | 2/2012 | Shafer et al. |
| 2002/0020262 A1* | 2/2002 | Gass .................... B23D 59/001 83/58 |
| 2011/0184558 A1* | 7/2011 | Jacob ................. A61B 19/2203 700/259 |

FOREIGN PATENT DOCUMENTS

| DE | 102005003489 A1 * | 8/2006 | ............... F16P 3/14 |
| DE | 10 2009 029 021 | 3/2011 | |
| JP | 11226889 A * | 8/1999 | |
| JP | 2002-296361 | 10/2002 | |

* cited by examiner

*Primary Examiner* — Dharti Patel
(74) *Attorney, Agent, or Firm* — Norton Rose Fulbright US LLP; Gerard Messina

(57) ABSTRACT

A method for operating a sensor system, having at least one capacitive sensor element, which is attachable to the surface of machines or machine parts, electrical field lines on the sensor element changing in the event of an approach and/or a contact of a body or object, and the at least one sensor element being connected to a control unit, which, based on the detected change of the field lines of the at least one sensor element, triggers a safety function on the machine or the machine part. The at least one sensor element has, in addition to fulfilling the safety function, an operating function, which is concluded from the location of the at least one sensor element and the time curve of the change of the field lines, and the safety function has priority over the operating function in a base state of the sensor system.

20 Claims, 2 Drawing Sheets

METHOD FOR SWITCHING A SENSOR SYSTEM BETWEEN MODES AND SWITCHABLE SENSOR SYSTEM

RELATED APPLICATION INFORMATION

The present application claims priority to and the benefit of German patent application no. 10 2012 211 231.6, which was filed in Germany on Jun. 29, 2012, and German patent application no. 10 2012 212 754.2, which was filed in Germany on Jul. 20, 2012, the disclosures of which are incorporated herein by reference.

FIELD OF THE INVENTION

The present invention relates to a method for operating a sensor system and a sensor system.

BACKGROUND INFORMATION

A method for operating a sensor system and a sensor system are discussed in DE 10 2009 029 021 A1 of the applicant. It includes at least one capacitive sensor element, whose field lines generated thereby change in the event of an approach of a body or object, the change being able to be detected and analyzed with the aid of a control unit. The known sensor system is used in particular in handling robots or similar machines or devices for the purpose of switching the handling device into a safety mode, in the case of which the movement of the affected machine component is stopped, in the event of approach of a human or an (unexpected) approach of an object to a moving machine part, for example, a robot arm. In particular, injuries in the event of a collision of the handling device with a human or damage to objects or the handling device may thus be avoided or at least minimized. The known sensor system may include a plurality of planar sensor elements, which are arranged over the entire surface of the handling device like a sensor skin, for example, and are connected to one another by circuitry.

Applications in which handling devices collaborate with humans in a shared workspace will become more and more important in the future. Such applications occur, for example, in product manufacturing, for example, in assembly, during welding or lacquering, in the field of so-called service robots (for example, for pick-up and delivery services), cleaning robots, inspection robots, in the field of autonomous vehicles in the environment of humans, in the field of medical robots, which work closely with humans (for example, for angiography and tumor treatment), or other applications. The collaboration capability of such machines is essentially based on two basic functions, safe movement in the environment of humans and intuitive interaction with humans.

With respect to the interaction capability, it is typically implemented using classical operating elements such as buttons, switches, keyboards, rotating and sliding controllers, joysticks, computer mice, and touch screens. Speech recognition systems are also known, which react to spoken commands, and also visual systems, which recognize the movements of an operator (for example, in the form of gestures). In addition, various interaction technologies are known for controlling robots, e.g., indirect operation via classical operating elements, or direct operation, in the case of which the operator displaces the robot arm using his hands (detection of the operator command by measuring the motor current via the drive regulation or by additional torque sensors in the joints of the robot arm).

SUMMARY OF THE INVENTION

The present invention is based on the object of providing a method for operating a sensor system or a sensor system according to the descriptions herein so that it is suited to be used both as a safety system to avoid collisions of machines or machine components with humans or objects, and also as a system for interaction between a machine and an operator.

This object may be achieved in the case of a method for operating a sensor system having the features described herein essentially in that the sensor element has, in addition to a safety function, an operating function, an operating function is concluded from the location of the at least one sensor element and the time curve of the change of the field lines, and the safety function has priority over the operating function in a base state of the sensor system. In other words, this means that the same sensor element of a sensor system may be used in different ways, as a trigger for a safety function and as a switching element for an operating function. For safety reasons, it is provided that the safety function has priority over the operating function in a base state of the sensor system. This means that, for example, no gestures may be executed in direct proximity to the moving machine or the moving robot. If an operator attempts this, the safety function will decelerate the machine or the robot safely to a standstill. Only then may the operator retrieve the desired function using a gesture. In particular injuries to persons and damage to machines or objects are thus reliably.

Advantageous refinements of the method according to the present invention for operating a sensor system and a sensor system are set forth in the further descriptions herein. All combinations of at least two features which are disclosed in the claims, the description, and/or the figures fall within the scope of the present invention. Features disclosed with respect to the method are to be considered to be disclosed and claimable with respect to the device and features disclosed with respect to the device are simultaneously to be considered to be disclosed and claimable with respect to the method.

To simplify the operation of a machine or a robot, for example, it may be provided that the safety function may be temporarily disabled by the operation of a safety switch. This means that by intentionally pressing a safety switch, the machine or the robot is immediately switched into an operating mode, in the case of which an approach of a human or an object to a sensor element is not classified as safety-relevant, so that, for example, the movement of the machine or the robot is not stopped. In this operating state, the operator assumes responsibility for the safe operation of the machine or the robot system. The safety switch may be configured in such a way that, when it is not being operated or pressed by an operator, it switches back into its original switching state, in which the sensor element of the machine or the robot is in its safety mode.

Another advantageous embodiment of the present invention provides that the safety function has three different switching states as a function of the detected distance of a body or an object from the machine or the machine part, that in the first switching state, which is designated as near range and which is assigned to a short distance (for example, less than 20 cm) of the body or object from the machine or the machine part, the movement is completely stopped by the safety function, that in a second switching state, which is designated as moderate range and which is assigned to a moderate distance (for example, between 20 cm and 40 cm) of the body or object from the machine or the machine part, the movement of the safety function is limited to a safe speed V1, and that in a third switching state, which is designated as far range and which is assigned to a long distance (for example, greater than 40 cm) of the body or object from the machine or the machine part, the movement of the safety function is limited to a safe speed V2, which may be greater than speed V1. The following is meant here: at close range, the safety function ensures a safe stop, so that a hazard for the operator no longer originates from the movement of the machine or the machine part and the operator may execute arbitrary gestures directly in front of the sensor elements. In the moderate range, only gestures may be executed, in the case of which the hand approaches not closer than up to a minimum distance of, for example, 20 cm to the moving machine or the machine part. This switching state may be used for the purpose, for example, of guiding a robot in a contactless way using a hand, in that the robot regulates its position so that its distance and its orientation to the hand always remain identical. At far range, there is no restriction for the execution of gestures.

In a simplified embodiment, the moderate range may be omitted, so that only a switching threshold of 20 cm exists, for example, which separates the near range from the far range.

Another advantageous embodiment of the method according to the present invention provides that the operating function has multiple operating modes, a first operating mode relating to teaching of a gesture by the sensor system, and a second operating mode relating to execution of a gesture, which was taught in the first operating mode, by the machine or a machine part. The first operating mode therefore means, for example, that a specific gesture is repeated multiple times in succession by an operator, and the sensor system stores the particular sensor values detected during the execution of the gesture. An "average" signal curve for a specific gesture may be ascertained from the stored sensor values, for example, which, subject to tolerance values, also allows the recognition of gestures which deviate from this "average" gesture, but are obviously to trigger the same function by the control unit. As soon as the teaching process or the first operating mode is completed, the sensor system operates in the second operating mode. If a gesture is executed, the control unit thus compares the average signal curves of stored gestures which are stored in the control unit to the currently detected signal curve of a gesture. If a correspondence is found, a specific gesture is concluded, which has the result that the control unit of the machine or the robot triggers a specific action, for example, a screwing process or the like.

A sensor system according to the present invention is distinguished in an advantageous embodiment in that in the operating mode, multiple sensor elements form an operating panel, the input values of the sensor elements, which are detected by the control unit, being able to be analyzed with the aid of a computer unit.

It particularly may be that when the sensor elements forming an operating panel represent a subset of all sensor elements situated on the machine or the machine part, and when the subset of the sensor elements may be selected from the total set of the sensor elements. The following is meant here: A machine or a machine component is covered with a plurality of sensor elements. For example, a matrix of 5×5 sensor elements arranged adjacent to one another forms an operating panel. This operating panel may be configured at an arbitrary point of the machine surface by an appropriate activation of corresponding sensor elements by the control unit. This means that, for example, the affected operating panel may either be formed on a robot arm, or in the area of a support element. With the aid of such an embodiment of the present invention, an operating panel of the sensor system may be freely adapted to greatly varying machines or machine components and also applications, without additional hardware devices having to be affected for this purpose. The assignment of the sensor elements to the operating panels is performed solely by software.

According to the exemplary embodiments and/or exemplary methods of the present invention, it may be provided that at least one sensor element in the operating mode acts as a digital switch or as an analog switch, for example, like a slide controller. This means that in the operating mode, for example, if a specific threshold value is exceeded at the sensor element, the control unit turns a specific machine element on or off, regardless of the value by which the threshold value was exceeded. Alternatively thereto, however, the absolute level of the detected measured value of the sensor element may also be used for the purpose of being converted into a corresponding speed signal for operating a machine element, for example, so that the level of the sensor signal corresponds to a specific analog value (for the speed of the machine component).

In order to give an operator feedback as to whether, for example, a gesture executed by him was correctly detected or interpreted by the sensor system, it may be provided in another embodiment of the present invention that at least one visual, acoustic, or other display element is provided, with the aid of which the control unit outputs a signal in the operating mode. For example, this display element may be a monitor, which signals the detected gesture or a specific operator command by a corresponding visual display as feedback to the user. Alternatively thereto, for example, it may be communicated to the operator by an acoustic signal that the control unit has unambiguously recognized a specific gesture or also if a gesture was not recognized. Other types of elements, for example, LEDs, may also be used for such feedback for the operator.

In addition, it particularly may be that if the at least one sensor element acting in the operating mode is visually marked on the machine or the machine component. It is thus signaled to the operator at which point he is to execute a gesture, for example, so that it may be recognized as easily and unambiguously as possible by the sensor system. It is conceivable, for example, to perform such a marking with the aid of a light, which is only recognizable in the operating mode of the machine. However, printed markings or the like may also be used, so that the operator recognizes the area of the sensor elements via which an input of gestures is made possible, for example.

Further advantages, features, and details of the exemplary embodiments and/or exemplary methods of the present invention result from the following description of exemplary embodiments and on the basis of the drawings.

DETAILED DESCRIPTION

Figure 1:
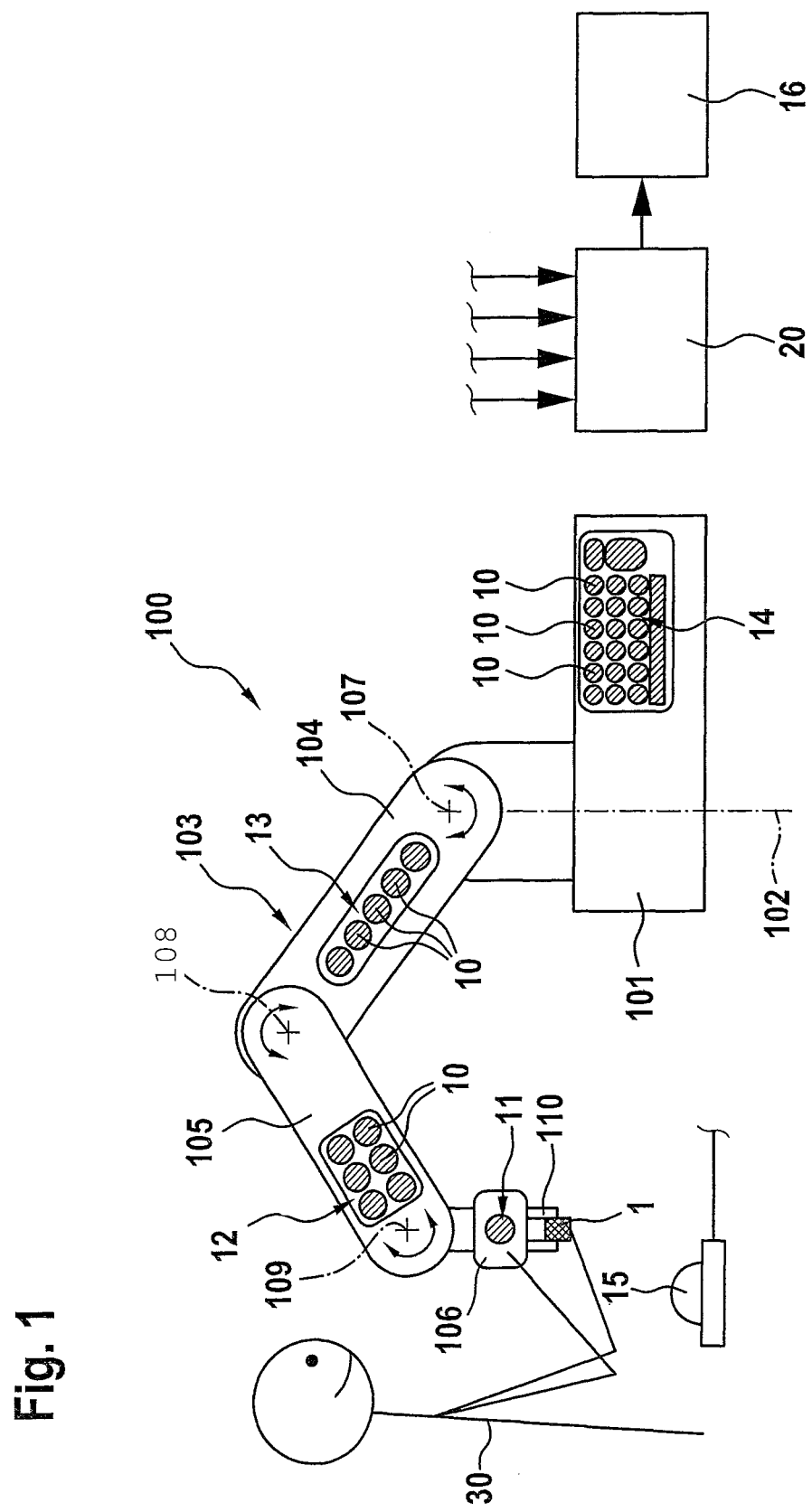
FIG. 1 shows a schematic view of a handling robot during the transfer of an object by an operator.

Identical elements or elements having an identical function are provided with identical reference numerals in the figures.

FIG. 1 shows a machine in the form of a handling robot 100. Handling robot 100 includes a machine base 101, which carries a robot arm 103, which is rotatably mounted in a first axis 102. Robot arm 103 has three arm sections 104 through 106, which are in turn each mounted so they are pivotable in one axis 107 through 109 in the direction of the double arrows shown. Arm section 106 carries a gripping mechanism 110 for gripping an object 1. Such a handling robot 100 thus described is suited for the purpose of receiving object 1 within the range of robot arm 103 at an arbitrary location and delivering it at a second, also arbitrary location.

At least areas of handling robot 100 are covered by a sensor skin (not shown in detail) having sensor elements 10, which are each configured as capacitive sensor elements 10. Sensor elements 10 form a sensor system. Sensor elements 10 may each be configured identically; however, they may also be configured differently or have different sizes. With respect to a fundamental construction of such a sensor element, reference is made to DE 10 2009 029 021 A1 of the applicant, which is thus to be part of this application.

Sensor elements 10 are connected to a control unit 20 of handling robot 100. In control unit 20 of handling robot 100, the particular locations of sensor elements 10 on handling robot 100 are stored. For example, some of sensor elements 10 are used according to the present invention in such a way that the control of a function or an operation of handling robot 100 may be performed via these sensor elements. For this purpose, multiple virtual operating panels 11 through 14 are generated on the surface of handling robot 100, sensor elements 10 assigned to individual operating panels 11 through 14 being freely assignable as a subset to all of sensor elements 10 situated on handling robot 100 via an input unit (not shown), for example. Operating panels 11 through 14 described hereafter are only to represent possible variants, the number and configuration of which are variable to a high degree.

First operating panel 11 is situated in the area of third arm section 106 of robot arm 103 on a lateral surface and acts as a digital switching element, so that if the hand of an operator 30 approaches, for example, gripping unit 110 is opened or closed. Operating panel 12 is situated on second arm section 105 of robot arm 103 and includes six sensor elements 10, for example, which are used for the sequence control of the operation of handling robot 100, so that if the hand of operator 30 approaches a specific sensor element 10 in operating panel 12 of handling robot 100, for example, a stored operating program starts or is executed. Operating panel 13 is situated on first arm section 104 of robot arm 103 and is used as a virtual proximity surface for guiding robot arm 103. In particular, if an identical operating panel 13 is situated on the opposite side of first arm section 104 on robot arm 103, which is parallel to the plane of the drawing of FIG. 1, robot arm 103 may be caused to rotate in first axis 102 in the desired direction, in order to teach a specific movement sequence of robot arm 103, by the approach of the hand to one or the other operating panel 13. Finally, an operating panel 14 is situated on machine base 101, which is used for data input in the form of a virtual keyboard, and includes a plurality of sensor elements 10 situated adjacently to one another and one over another.

To make operating panels 11 through 14 identifiable for operator 30, it may be provided that operating panels 11 through 14 are emphasized by appropriate markings or visual aids.

Sensor elements 10 shown in FIG. 1 in operating panels 11 through 14 are used, like sensor elements 10 (not shown in FIG. 1) distributed over the surface of handling robot 100, which are not situated in operating panels 11 through 14, for stopping the movement of handling robot 100 during the operation of handling robot 100 in the so-called safety mode in the event of an imminent collision of handling robot 100 with a human or an object, in order to prevent injuries or damage. For this purpose, control unit 20 analyzes the input signals generated by individual sensor elements 10. In addition to the safety-relevant function of sensor elements 10, they are used, as explained above, in operating panels 11 through 14 for the purpose of interacting with operator 30 (operating mode).

The safety mode has priority over the operating mode. This means that, for example, if operator 30 approaches handling robot 100, which is recognized by sensor elements 10, initially the speed of robot arm 103 is throttled to a safe value, so that contact with moving robot arm 103 is precluded. Sensor elements 10 situated within operating panels 11 through 14 are then ready to recognize gestures of operator 30. If the robot receives a command at any time to move toward an object or a human, to fall below the preset safety distance, or to exceed the maximum speed corresponding to the distance, the execution of the command is prevented by the priority of the safety mode.

Manually pressing an optional safety switch 15, which is connected to control unit 20 of handling robot 100, by operator 30 causes the approach of a human or an object to be classified as not safety-relevant, while the recognition of gestures is still active. In this operating state, the operator assumes responsibility for the safe operation of the robot system.

As long as safety switch 15 is pressed, control unit 20 of handling robot 100 or its sensor elements 10 switch from the safety mode into the operating mode, in the case of which in particular sensor elements 10 situated within operating panels 11 through 14 are used to recognize gestures of operator 30 or inputs. It may also be provided that in the event of an approach of operator 30 to sensor elements 10, control unit 20 initially switches into a mode in which sensor elements 10 in the area of operating panels 11 through 14 are used to recognize gestures, for example, while the movement of handling robot 100 is simultaneously performed at reduced speed in comparison to normal operation. Upon further approach of operator 30 to sensor elements 10, in the case of which the distance falls below a specific minimum distance of, for example, 10 cm, control unit 20 switches handling robot 100 over into the safety mode, during which any movement of handling robot 100 or its robot arm 103 is stopped.

In order to provide operator 30 with feedback about inputs made by hand via operating panels 11 through 14, a visual, acoustic, or other display unit 16 may be provided, which receives a corresponding signal from control unit 20 if, for example, a specific gesture of operator 30 was correctly recognized (or was not recognized at all), or if, for example, a gesture is to be repeated.

Figure 2:
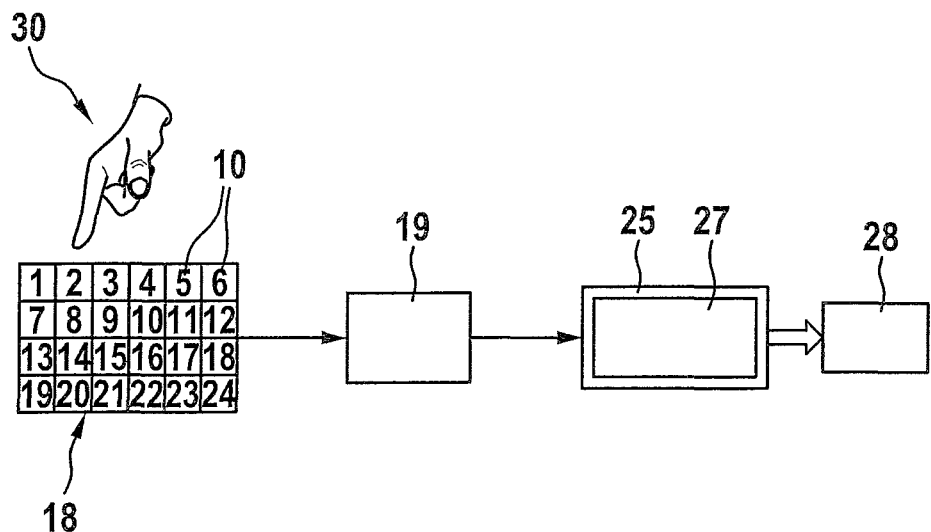
FIG. 2 shows the fundamental structure of an interaction system, in which an operating panel constructed from 24 sensor elements is used to recognize a gesture.

FIG. 2 shows an operating panel 18, including 24 sensor elements 10. Sensor elements 10 are situated in the form of a 4×6 matrix in operating panel 18 and are connected to a central unit 19, which is part of a computer unit. Operating panel 18 thus formed detects the gestures of operator 30. For this purpose, each of sensor elements 10 delivers a measured value $D_i$, which varies with the distance of the finger of operator 30 from particular sensor element 10. Central unit 19 takes over the cyclic request and processing of measured values $D_i$ of all sensor elements 10 and also the output thereof via an interface. A control computer 25 having an integrated software interaction module 27, which is connected to central unit 19, reads in measured values $D_i$ of all sensor elements 10 as a time series and analyzes them in the following way, as an example:

preprocessing of measured values $D_i$ recognition of taught patterns in the data, for example, with the aid of correlation functions classification of the patterns according to operating elements and gestures assignment of the recognized gestures to commands, and command execution in step 28 (for example, by retrieval of functions, output of signals).

Figure 3:
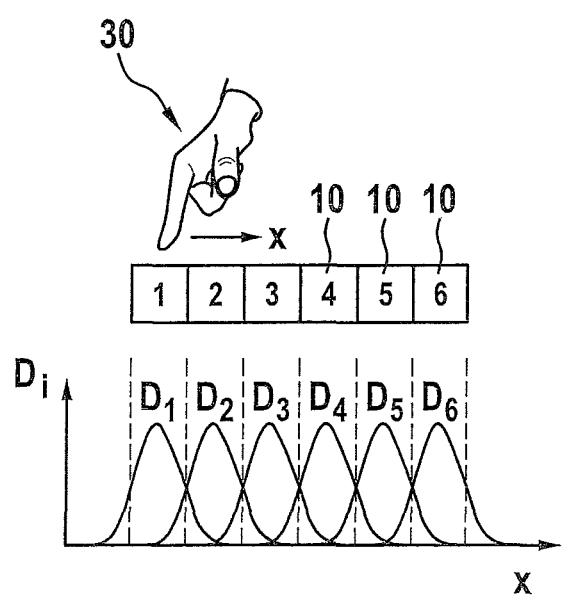
FIG. 3 shows a view to illustrate an exemplary mode of operation of a virtual operating element for detecting a keypress.

FIG. 3 shows an example of the mode of operation of a virtual operating element having six sensor elements 10 arranged adjacent to one another. In this case, the operating element is used to detect a keypress. The index finger of an operator 30 is guided in the X direction of the arrow shown. The diagram shown below six sensor elements 10 schematically shows the measured value curve of all six sensor elements 10, as a function of the X position of the finger. Each sensor element 10 has a characteristic curve similar to a Gaussian curve, the Gaussian curves of adjacent sensor elements 10 typically overlapping. The X position of the finger of operator 30 may be derived from six measured values $D_1$ through $D_6$ with the aid of interpolation functions. The resolution of the finger position is not linked to the width of sensor element 10 or the width of the finger. If adjacent sensor elements 10 are provided, different finger positions may also be detected within a sensor element 10 by interpolation. This measurement principle is transferred to flatly situated sensor elements 10, in order to detect the finger position in both spatial directions (i.e., in parallel and perpendicularly to the plane of the drawing of FIG. 3). In a similar way, the distance of the finger of operator 30 may also be detected on the basis of characteristic sensor data, so that the spatial position of the finger of operator 30 may be ascertained.

If gestures are to be recognized with the aid of sensor elements 10, these gestures are transformed as a result of the input signals of sensor elements 10 into a chronological sequence of sensor data. One task of control computer 25 shown in FIG. 2 is to take over the back transformation, i.e., to recognize gestures in the chronological sequence of sensor data. Furthermore, module 27 situated in control computer 25 has the two operating modes "configure" and "execute." In the operating mode "configure," the virtual operating elements (operating panels 11 through 14) are configured by an operator 30 before handling robot 10 is put into operation. This is carried out in the following steps, for example:

a. Visualization of the operating elements (operating panels 11 through 14) on the surface of handling robot 100, for example, by stickers or in the form of LEDs delimiting operating panels 11 through 14.

b. "Demonstration" of the gesture at the operating element by operator 30. The gesture is stored as a chronological sequence of characteristic sensor data. Permissible variations of the gesture are subsequently also demonstrated.

c. Teaching of the gesture: The stored sensor data are reduced to characteristic features. A teachable classifier is trained using these features. The classifier is multiclass capable, i.e., it may recognize all taught gestures again and assign them separately. In the case of analog gestures, it is capable of determining the analog value of the gesture (for example, the distance between the hand of an operator 30 and a sensor element 10).

d. Linking the gestures to functions: Operator 30 assigns each taught gesture to a function or a sequence of functions, which is to be automatically executed upon recognition of the gesture. For example, this may be a function sequence on control computer 25 or a command which is transmitted via a communication interface to peripheral units.

In the operating mode "execute", the measured values of sensor elements 10 are continuously cyclically read in and the characteristic features are calculated. The previously taught classifier continually checks whether a taught gesture was executed. If so, control unit 20 triggers the execution of the function linked thereto.

The method thus described for operating the sensor system including sensors 10 may be altered or modified in manifold ways, without deviating from the exemplary embodiments and/or exemplary methods of the present invention. In particular, the use of such a sensor system is not necessarily restricted to the use in handling robots 100, but rather may also be applied in the case of other machines or machine components.

What is claimed is:

1. A method for operating a sensor system, the sensor system including at least one capacitive sensor element which is attachable to a surface of a machine, the method comprising:

receiving, by a control unit from each respective at least one capacitive sensor element in the sensor system, sensor values reflecting changes in electrical field lines at the respective sensor element based on at least one of an approach and a contact of one of a body and an object with the machine;

analyzing, by the control unit, the received sensor values;

triggering, by the control unit, a safety function of the machine if the control unit determines, based on the analysis, the safety function is warranted;

using the received sensor values for an operating function of the machine, wherein the control unit uses received sensor values from the at least one sensor element both for triggering the safety function of the machine and for the operating function of the machine so that the at least one sensor element also has, in addition to the safety function, an operating function, wherein the control unit responds to the received sensor values in a first way when the control unit is triggering the safety function, and in a second way, different from the first way, when the control unit is using the received sensor values for the control function;

wherein the control unit determines the operating function based on a location of the at least one sensor element and a time curve of the changes in the field lines, and wherein the control unit prioritizes the functions of the machine and, in a base state of the sensor system, the safety function has priority over the operating function.

2. The method of claim 1, further comprising:

disabling, by an operation of a safety switch, the safety function for a temporary time period.

3. The method of claim 2, further comprising:
automatically triggering, by the control unit and based on the disabling of the safety switch, the operating function of the machine.

4. The method of claim 1, wherein:
the safety function of the at least one sensor element has at least two different switching states, and wherein each one of the at least two different switching states is (i) selected as a function of a detected distance of one of the body and the object from the machine and (ii) assigned to a distance range,
for each one of the at least two different switching states, the safety function safely limits a maximum speed of the machine, and
the control unit is configured to trigger the operating function at a same time as the safety function.

5. The method of claim 4, wherein:
the safety function of the at least one sensor element has at least three different switching states, and wherein each one of the at least three different switching states is: (i) selected as a function of a detected distance of one of the body and the object from the machine and (ii) assigned to a distance range, and
for two of the at least three different switching states, the safety function safely limits a maximum speed of the machine and for a third one of the at least three different switching states, the safety function completely stops the machine.

6. The method of claim 4, wherein in a first one of the at least two different switching states the maximum speed of the machine is limited to a first value and in a second one of the at least two different switching states the maximum speed is limited to a second value that is higher than the first value.

7. The method of claim 6, wherein the first one of the at least two different switching states is associated with when the detected distance falls within a first range from the machine and the second one of the at least two different switching states is associated when the detected distance falls within a second range from the machine, the second range being greater than and outside of the first range.

8. The method of claim 1, wherein the operating function has multiple operating modes including at least:
a first operating mode, wherein during the first operating mode the sensor system is taught a gesture by storing sensor values during an execution of the gesture by an operator, and
a second operating mode, wherein during the second operating mode the machine executes an action associated with the gesture.

9. The method of claim 8, wherein when the operating function is in the second operating mode, the control unit:
compiles the received sensor value from each of the at least one sensor element,
compares the compiled sensor values to an average signal curve having an associated stored gesture, and
when the comparison indicates a match between the compiled sensor values and the average signal curve, executes the action associated with the associated stored gesture.

10. The method of claim 1, wherein the operating function of the machine is one of: (i) to grip and release the object, (ii) to implement a sequence of tasks, (iii) to establish a movement to guide an extendable portion of the machine, and (iv) to engage in a preset movement based on ad hoc commands.

11. The method of claim 10, wherein the operating function being one of (i) to (iv) is inferred from the location of the at least one sensor element on the machine including a first arm section, a second arm section, a third arm section, and a base section.

12. The method of claim 10, wherein when the operating function is:
(i) to one of grip and release the object, the sensor value is used in a first way to identify a user and a proximity of the user to a portion of the machine configured to grip and release the object,
(ii) to implement the sequence of tasks, the sensor value is used in a second way to determine the sequence based on a selection of one sensor element associated with a particular task from among the tasks that are assigned to each at least one sensor element,
(iii) to establish the movement to guide the extendable portion of the machine, the sensor value is used in a third way to teach a gesture associated with the movement by contributing towards a signal curve for the gesture, and
(iv) to engage in the preset movement based on ad hoc commands, the sensor value is used in a fourth way to receive data input associated with the ad hoc commands.

13. The method of claim 10, wherein when the operating function is to establish the movement to guide the extendable portion of the machine, the control unit uses the sensor value to teach a gesture associated with the movement by contributing towards a signal curve for the gesture, and the control unit compiles an average signal curve from the signal curve from each of the at least one sensor element.

14. The method of claim 1, wherein when the control unit triggers the safety function, the machine is one of decelerated and held at a standstill.

15. A sensor system, comprising:
at least one capacitive sensor element attachable to a surface of a machine and connected to a control unit, each respective at least one sensor outputting sensor values;
wherein the control unit is configured to:
receive the sensor values;
switch the machine between a safety mode and an operating mode based on the sensor values,
wherein the control unit uses the received sensor values from the at least one sensor element for both the safety mode and the operating mode so that the at least one sensor element has, in addition to a safety function, an operating function;
wherein the control unit responds to the received sensor values in a first way when the control unit is using the received sensor values in the safety mode, and in a second way, different from the first way, when the control unit is using the received sensor values in the operating mode; and
wherein during a base setting, switch the machine into the safety mode.

16. The sensor system of claim 15, wherein, when the control unit switches the machine into the operating mode, the control unit activates multiple sensor elements from the at least one sensor element that are in a formation on an operating panel to each generate respective sensor values based on detected changes in electrical field lines, and
the control unit, based on an analysis of the sensor values from each of the activated multiple sensor elements, recognizes a gesture.

17. The sensor system of claim 16, wherein the multiple sensor elements in the formation on the operating panel are a subset of all sensor elements situated on the machine, and wherein the subset of the sensor elements is formed from the total set of the sensor elements by assignment.

18. The sensor system of claim 15, wherein, during the operating mode, the sensor values from the at least one sensor element are used by the control unit to at least one of: switch an element of the machine one of on or off and convert the sensor values to a corresponding analog signal.

19. The sensor system of claim 15, further comprising:
- at least one visual, acoustic, or other display unit communicatively coupled to the control unit, the display unit outputting a signal from the control unit in the operating mode.

20. The sensor system of claim 15, wherein the at least one sensor element acting in the operating mode is identifiable by a visual marking on the machine.

* * * * *